Aug. 22, 1933.    D. P. SCHRIER ET AL    1,923,751
AUTOMATIC CUT-OFF MACHINE
Filed Sept. 19, 1931    3 Sheets-Sheet 3
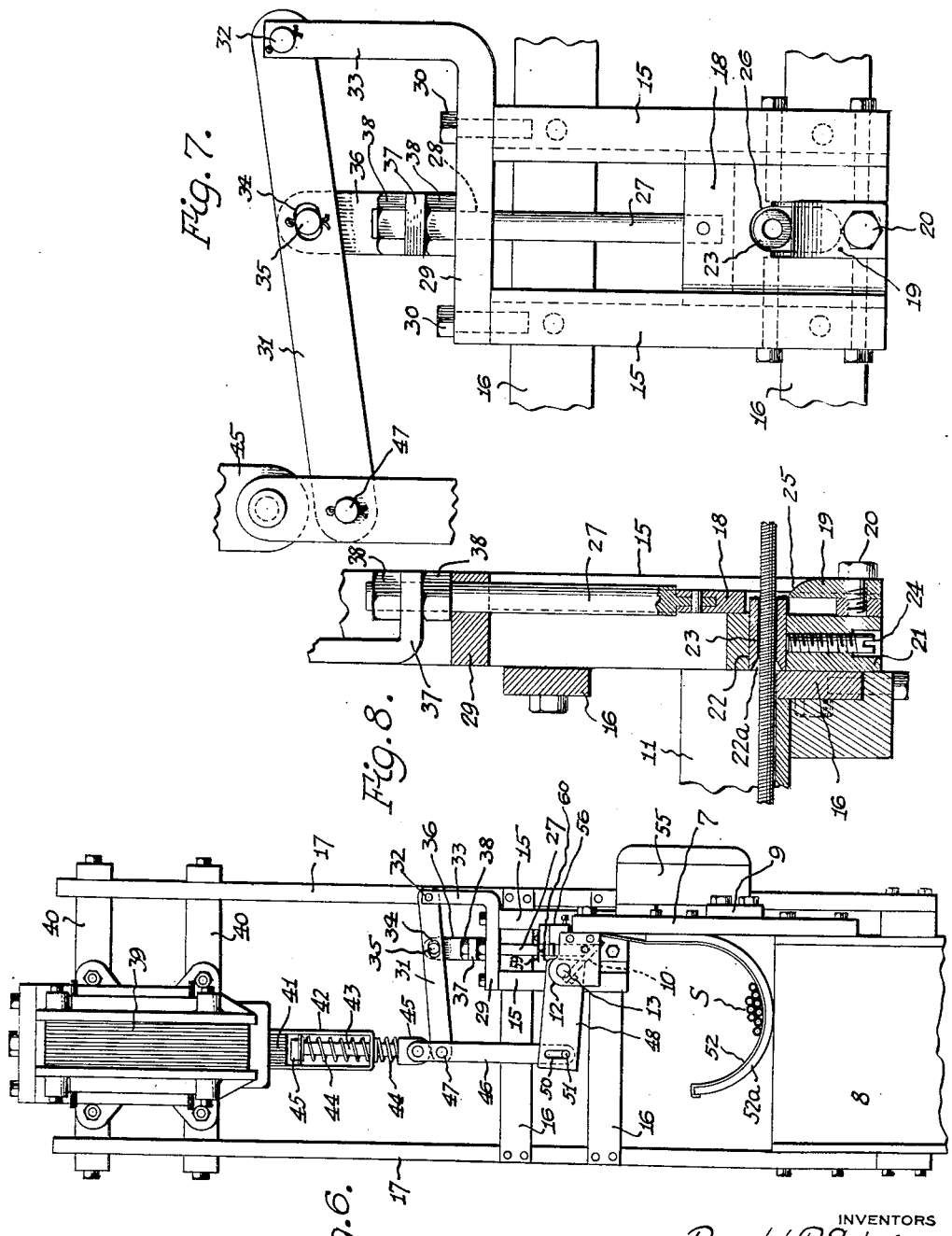
INVENTORS
Donald P. Schrier,
Charles F. Jackson,
BY
ATTORNEYS Patented Aug. 22, 1933

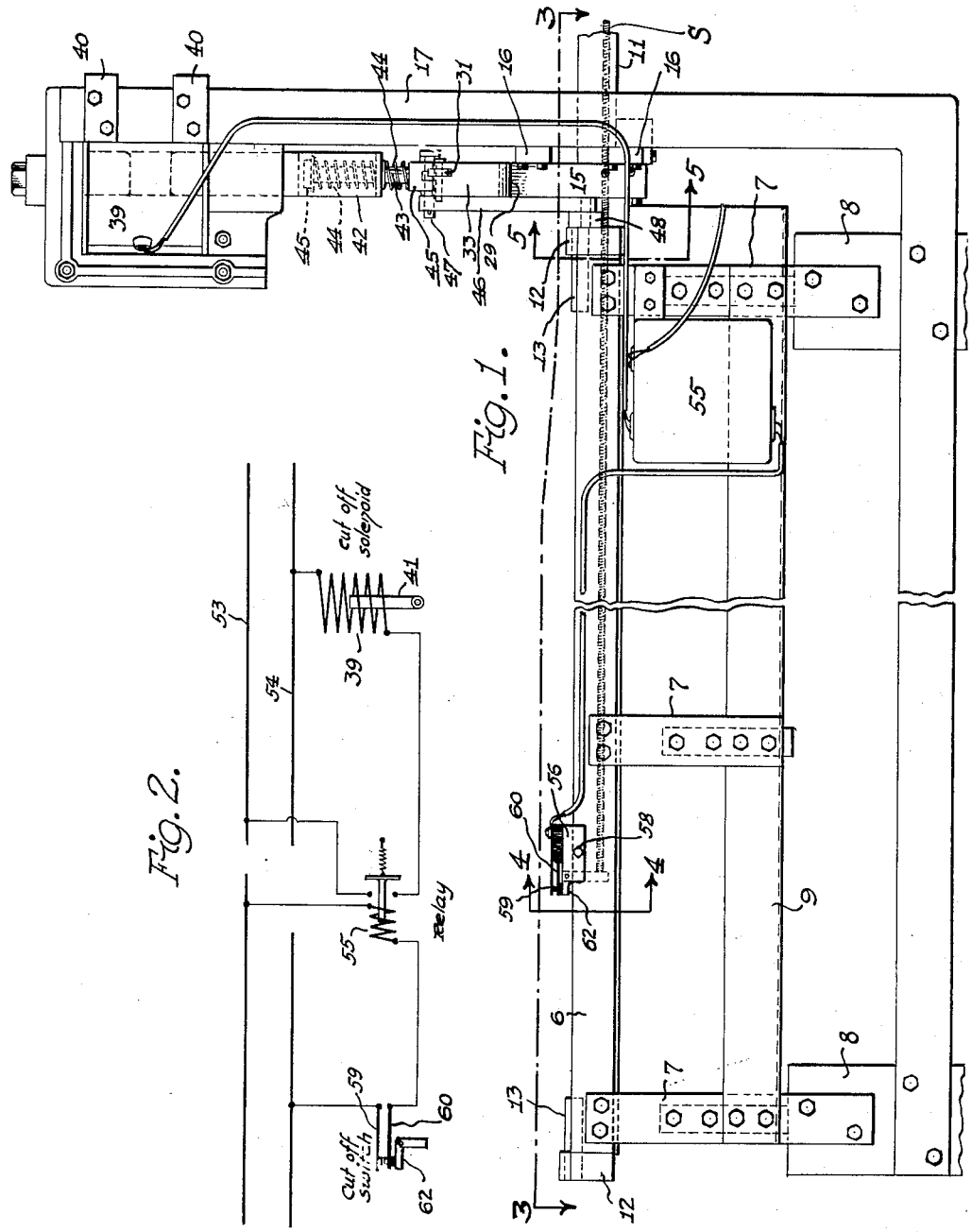

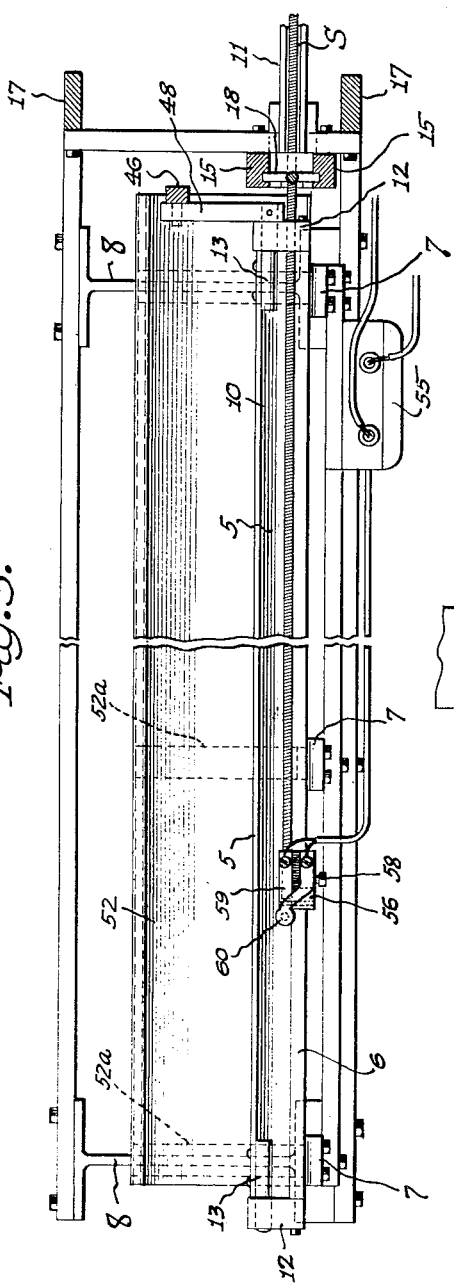

1,923,751

UNITED STATES PATENT OFFICE 1,923,751

AUTOMATIC CUT-OFF MACHINE

Donald P. Schrier and Charles F. Jackson, Jackson, Mich., assignors to Reynolds Spring Company, Jackson, Mich., a Corporation of Michigan Application September 19, 1931
Serial No. 563,808

4 Claims. (Cl. 140—145)

Our invention relates to cutting machines and has particular reference to a machine of this type for cutting longitudinal elements such as coiled springs into predetermined lengths.

An object of the invention is to provide a machine of this character wherein a continuously moving longitudinal element, such as a helically wound stock or spring, is automatically severed into predetermined lengths.

Further, the invention provides an automatically operated knife for severing the stock which is actuated by electrical mechanism embodying a switch which in turn is operated after a predetermined length of stock has passed beyond the knife.

The invention also contemplates a trough or guide in which the stock moves and is arranged to discharge the severed piece into a receiver or holder after each cutting operation.

It is another object of the invention to provide a mechanism of this character wherein both the knife and discharge for the trough are operated by a common actuating mechanism.

With the preceding and other objects and advantages in mind, the invention consists in the novel combination of elements, constructions and arrangement of parts and operations to be hereinafter referred to, claimed and illustrated in the accompanying drawings, wherein—

Figure 1 is a side elevation of a cutting machine constructed in accordance with my invention;

Fig. 2 is a partial diagrammatic view of the electrical circuit used in conjunction with the invention;

Fig. 3 is a horizontal view taken on substantially the line 3—3 of Figure 1;

Fig. 4 is a vertical section taken on the line 4—4 of Figure 1;

Fig. 5 is a similar view taken on the line 5—5 of Figure 1;

Fig. 6 is an end elevation of the machine;

Fig. 7 is an enlarged detail view illustrating the reciprocatory knife and actuating mechanism therefor; and Fig. 8 is a fragmentary view partly in section and partly in elevation illustrating the reciprocatary knife and trough or guide for the stock.

Referring to the invention in detail, a horizontally arranged trough or guide 5 is provided, into which the longitudinally moving stock or coil spring S is fed. The trough or guide comprises a vertical wall 6 which is attached to and supported by vertically extending uprights 7, the end ones of which being attached to vertical columns 8. A horizontally extending brace bar 9 connects the uprights 7 as shown in Figure 1. An inclined movable wall 10 is arranged to one side of the wall 6 with its lower end overlapping and abutting the underside of the former. As shown particularly in Figures 4 and 6, the stock S is confined between the inclined wall 10 and the vertical wall 6 to guide the stock in a true longitudinal direction, after it passes from the channel shaped guide 11 leading from a coiler, roll forming machine or straightener.

Attached to the ends of the wall 6 and projecting at right angles from its inner face is a pair of bearing plates 12 which receive laterally extending pintles 13 which are secured to the inner face of the wall 10 at its upper edge and at its ends by fastenings 14. Normally, the wall 10 occupies the position illustrated in Figures 4 and 5 but is adapted to be swung away from the wall 6 to discharge each severed length of stock after each cutting operation, as will be hereinafter specifically pointed out.

A knife assembly is provided at the forward end of the trough or guide 5 for severing the stock in predetermined lengths and comprises a pair of spaced vertically extending parallel guides 15 which are located at opposite sides of the trough and are attached to cross members 16 mounted on uprights 17. Arranged for reciprocatory movement in the guides 15 is a slide 18, to the outer face of which a knife blade 19 is held by a removable fastening 20. At the lower ends of the guides a cross member 21 is mounted and is provided with a transverse opening 22 which is located in longitudinal alinement with the opposed portions of the walls 6 and 10 that contact with the stock. A tubular die 23 is arranged in the opening 22 with its rearward end projecting beyond the outer face of the cross member 21 through which the stock passes from the guide 11. A set screw 24 is provided in the cross member 21 for locking the die in position. To facilitate entrance of the stock into the die the forward end of its bore is flared or beveled as at 22a.

As shown particularly in Fig. 8, the upper edge of the knife is beveled as indicated at 25 and cooperates with the outer end of the die in severing the stock incident to the upward travel of the slide. In order to allow for the vertical movement of the slide it is formed with a vertically extending slot 26 into which the projecting end of the die extends. The slide 18 is connected with a vertically extending stem 27 that slidably extends through a central opening 28 in a cross bar 29, the latter being attached to the upper ends of the guides 15 by fastenings 30. A substantially horizontal lever 31 is arranged above the stem 27 and has one end pivotally connected as at 32 to an upstanding extension 33 on the outer end of the cross member 29. At a point intermediate its ends this lever is provided with an elongated opening 34 which receives a lateral stud 35 projecting from the upper end of a link 36, the latter having a perforated ear 37 formed at its lower end and extending at right angles thereto and which is received on the upper end of the stem 27. Jamb nuts 38 are threaded upon the stem at opposite sides of the ear to secure the link thereto.

For the purpose of raising the slide to move the knife edge 25 over the die to sever the stock, a solenoid 39 is supported on cross members 40 at the upper ends of the standards 17.

Carried by the lower ends of the armature or core 41 is a U-shaped member 42, and slidably connected thereto is a plunger 43 which is yieldably connected with the intermediate leg of the U-shaped member by opposed coil springs 44. The coil springs 44 abut the intermediate leg of the U-shaped member and engage heads 45 on the ends of the plunger. Depending from the lower end of the plunger and pivotally connected thereto is a vertically extending link 46 which has pivotal connection with the adjacent end of the lever 31 by a pivot 47.

The invention contemplates swinging the movable wall 10 away from the wall 6 subsequent to each cutting operation to discharge the severed piece and for this purpose a plate 48 is fixed to one of the trunnions by a suitable fastening 49. The plate 48 extends in a lateral direction and has its outer end provided with a vertically extending slot 50 which receives a stud or head 51 carried by the lower end of the link 46.

From the description thus far given it follows that upon energizing the solenoid 39 its core or armature will be raised and through the medium of the plunger 43 lifts the lever 31 and causes the cutting edge 25 to traverse the die 23 to sever the stock.

By the time that the severing action has taken place, the stud 51 will have moved to a position to engage the upper end of the slot 50, so that continued upward movement of the plunger and link 46 will swing the plate 48 in an upward direction and thus swing the wall 10 on its axis away from the wall 6 to permit the severed length of the stock to fall from the trough.

A substantially U-shaped sheet metal receiver 52 is supported beneath the trough 5 and is adapted to catch the severed lengths as they fall from the trough. The receiver 52 extends the entire length of the trough 5 and extends laterally beyond the same as shown in Fig. 3. U-shaped supporting brackets 52a attached to the uprights 7 are provided for supporting the receiver.

In order to operate the knife at predetermined time intervals so that the stock will be cut in predetermined lengths, an automatically operated electrical circuit is provided for controlling the flow of electrical energy to the solenoid. This circuit comprises a source of electrical energy 52 from which conductors 53 and 54 lead. As shown in Figure 2, the conductor 53 is connected with a relay 55 while the conductor 54 is in circuit with the solenoid.

A circuit closer is provided between the relay 55 and the conductor 54 which is adapted to be operated by the advancing end of the stock. This circuit closer consists of an insulated body 56 having a groove 57 in its under face to receive the upper edge of the wall 6. Passing transversely through the body at one side is a set screw 58 for securing the body to the wall 6. A fixed contact 59 is attached to the upper face of the body and extends rearwardly from the same. A movable contact 60 is also attached to the body and extends rearwardly therefrom beneath the fixed contact and is normally spaced therefrom. Pivotally mounted upon one side of the body for movement about a horizontal axis 61 and beneath the contact 60 is a bell crank 62 whose vertical leg extends into the trough in the path of the advancing stock. When the terminal of the stock engages the bell crank lever the horizontal leg thereof moves against the movable contact forcing the latter into engagement with the fixed contact to complete the circuit. The location of the circuit closure on the wall 6 thus determines the length of the stock to be cut and it will be understood that the circuit closure may be positioned at any desired point on the trough rearwardly of the knife.

As the stock is fed into the trough the forward end of the same engages the depending leg of the bell crank lever 62 and closes the circuit through the contacts 59 and 60. The completion of the circuit completes the circuit through the relay 55 and thus energizes the solenoid which raises the slide 18 as above set forth.

What we claim is:

1. In a machine of the character described, a trough into which longitudinal stock is adapted to be fed, a hinged bottom for said trough rotatable on horizontal trunnions, a radially extending plate fixed to one of the trunnions of said bottom, a knife arranged in advance of said trough including a reciprocatory blade, a pivoted lever operatively connected to said blade, a solenoid having its armature connected to said lever, and a lost motion connection between said lever and said plate whereby upon movement of said armature said lever is pivoted to actuate said knife and said plate is subsequently moved to pivot the bottom of said trough.

2. In a machine of the character described, a trough into which longitudinal stock is adapted to be fed, a hinged bottom for said trough rotatable on horizontal trunnions, a radially extending plate fixed to one of the trunnions of said bottom, a knife arranged in advance of said trough including a reciprocatory blade, a pivoted lever operatively connected to said blade, a solenoid having its armature connected to said lever, a lost motion connection between said lever and said plate whereby upon movement of said armature said lever is pivoted to actuate said knife and said plate is subsequently moved to pivot the bottom of said trough, an electric circuit for energizing said solenoid, and a control switch for said circuit actuated by said stock when a predetermined amount of the same is fed into said trough.

3. In a machine of the character described, a trough into which longitudinal stock is adapted to be fed, a hinged bottom for said trough rotatable on horizontal trunnions, a radially extending plate fixed to one of the trunnions of said bottom, a knife arranged in advance of said trough including a reciprocatory blade, a pivoted lever operatively connected to said blade, a solenoid having an armature, a link depending from armature and connected to said lever, and a slot and pin connection between said link and said plate whereby upon operation of said solenoid said lever is pivoted to actuate said knife and said plate is subsequently moved to pivot said bottom.

4. In a machine of the character described, a trough having a hinged bottom into which stock is adapted to be fed, a knife arranged in advance of said trough, a solenoid having an armature, and an operating connection between said knife and said armature and said hinged bottom, said operating connection including a lost motion device so that initial movement of said armature actuates said knife and continued movement moves said hinged bottom.

DONALD P. SCHRIER.
CHARLES F. JACKSON.